(12) United States Patent
Müller et al.

(10) Patent No.: US 6,972,153 B2
(45) Date of Patent: Dec. 6, 2005

(54) LAYERED COMPOSITE MATERIAL COMPRISING VARIOUS PRE-HARDENED RESIN LAYERS

(75) Inventors: Klaus Müller, Sulzbach (DE); Klaus Klemm, Oberelsbach (DE)

(73) Assignee: Basell Polyolefine GmbH, Frankfurt am Main (DE)

( * ) Notice: Subject to any disclaimer, the term of this patent is extended or adjusted under 35 U.S.C. 154(b) by 48 days.

(21) Appl. No.: 10/380,052

(22) PCT Filed: Sep. 18, 2001

(86) PCT No.: PCT/EP01/10760

§ 371 (c)(1),
(2), (4) Date: Mar. 11, 2003

(87) PCT Pub. No.: WO02/24447

PCT Pub. Date: Mar. 28, 2002

(65) Prior Publication Data

US 2004/0013891 A1 Jan. 22, 2004

(30) Foreign Application Priority Data

Sep. 22, 2000 (DE) ................................ 100 46 877

(51) Int. Cl.[7] ........................ B32B 27/30; B32B 27/42
(52) U.S. Cl. ...................... 428/212; 428/520; 428/522; 428/423.3; 156/275.5
(58) Field of Search ............................ 442/46, 58, 150; 428/212, 523, 520, 522, 423.3; 156/275.5

(56) References Cited

U.S. PATENT DOCUMENTS

| | | | |
|---|---|---|---|
| 4,857,613 A | 8/1989 | Zolk et al. | |
| 5,288,824 A | 2/1994 | Kerth et al. | |
| 2002/0127420 A1 * | 9/2002 | Weinert et al. | ............. 428/480 |

FOREIGN PATENT DOCUMENTS

| | | | |
|---|---|---|---|
| DE | 195 29240 | | 2/1997 |
| DE | 197 22339 | | 12/1998 |
| DE | 198 58173 | | 6/2000 |
| DE | 199 27549 | | 12/2000 |
| EP | 45 975 | | 2/1982 |
| EP | 45 977 | | 2/1982 |
| EP | 86 473 | | 8/1983 |
| EP | 171 200 | | 2/1986 |
| GB | 1 588 122 | * | 4/1981 |
| GB | 2111066 | | 6/1983 |
| JP | 87020916 | * | 5/1987 |
| WO | 97/23550 | | 7/1997 |
| WO | 01/03927 | | 1/2001 |

OTHER PUBLICATIONS

Website: www.fibersource.com "Polyester Fibers", undated.*

* cited by examiner

Primary Examiner—D. Lawrence Tarazano
(74) Attorney, Agent, or Firm—Novak Druce & Quigg; Jason D. Voight

(57) ABSTRACT

In a laminated composite comprising a support made of a thermoplastic polymer, an intermediate layer located thereon which is likewise made of a thermoplastic polymer and a heat-cured layer applied to the intermediate layer, a resin layer (a) having a degree of curing of at least 20% is additionally inserted between the support and the intermediate layer and a resin layer (c) having a degree of curing of at least 60% is inserted between the intermediate layer and the heat-cured layer.

10 Claims, No Drawings

LAYERED COMPOSITE MATERIAL COMPRISING VARIOUS PRE-HARDENED RESIN LAYERS

The present invention relates to a laminated composite comprising a support made of a thermoplastic polymer, an intermediate layer located thereon which is likewise made of a thermoplastic polymer and a heat-cured layer applied to the intermediate layer, wherein a resin layer (a) having a degree of curing of at least 20% is additionally inserted between the support and the intermediate layer and a resin layer (c) having a degree of curing of at least 60% is inserted between the intermediate layer and the heat-cured layer.

The present invention further relates to a process for producing this laminated composite and to its use for producing furniture, floor coverings, wall panels, household appliances or moldings in the electrical, building or automobile industry.

The previously known laminated composites which are used, in particular, in the furniture industry or household appliances industry consist essentially of a support layer of wood or wood fibers or individual paper sheets pressed together with addition of resin, onto which decorative layers and further heat-cured layers, known as overlays, are applied under the action of heat and pressure. The decorative layers used here frequently have wood, metal or marble texturing. The decorative layers are in many cases used as laminates together with the heat-cured layers applied to them.

Such laminated composites have the disadvantage that they are somewhat sensitive to moisture penetrating from the edges into the core layer because both wood, including wood fibers, or individual paper sheets tend to swell under the action of moisture. Furthermore, such laminated composites can only be shaped with relatively great difficulty.

For numerous industrial applications, for example in the automobile or electrical industry, surface materials which have a high compressive strength and a relatively high heat resistance and can also readily be provided with decoration are required.

In furniture production, use has for some time been made of surface materials in which a plurality of layers including a support layer, a decorative layer and a heat-cured layer present thereon, with the aid of further layers of, for example, paper or adhesive films, form a decorative laminated composite. However, such a laminated composite is very complicated to produce, often has a high formaldehyde content and displays unfavorable swelling behavior.

DE-A 197 22 339 discloses a laminated composite comprising a support layer made of polypropylene, a decorative layer located thereon and a heat-cured layer applied to the decorative layer. Furthermore, DE-A 198 58 173 describes a laminated composite comprising a support layer made of different thermoplastic polymers, for example certain copolymers of styrene or polyoxymethylene or polybutylene terephthalate, and a decorative layer applied thereto and a heat-cured layer located on this. Such laminated composites comprising a support layer made of thermoplastic polymers display, inter alia, a high heat and moisture resistance, better mechanical strength and easier processability compared to conventional laminated composites having support layers made of wood, wood fibers or paper. However, owing to the somewhat stiff and brittle nature of the individual polymer layers, the laminated composites known from DE-A 197 22 339 and DE-A 198 58 173 still have some disadvantages in processing and shaping, particularly in three-dimensional shaping to produce components for the automobile, household and electrical industries.

DE-A 199 27 549 relates to a laminated composite comprising a support made of a thermoplastic polymer, an intermediate layer located thereon and a heat-cured layer applied to the intermediate layer, where the intermediate layer comprises a thermoplastic as bonding material. The laminated composite described in this publication can be shaped very readily and has, inter alia, a high mechanical stability.

However, the previously known laminated composites have the disadvantage that the full degree of curing of the previously cured layers, i.e. the heat-cured layers, is achieved on the colder tool side only significantly later in the production process than on the hotter tool side on which the support material is located, since the heat necessary for the curing process firstly has to be transmitted by heat conduction from the support in the direction of the heat-cured layer. This results in a significant lengthening of the conduction process in order to ensure full curing of the surface of the laminated composite on which the heat-cured layer is located. In the case of the abovementioned laminated composites, the curing time necessary for this can only be shortened if previously cured layers are used, which would, however, lead to reduced moldability of the laminated composites.

It is an object of the present invention to remedy the disadvantages indicated and to provide an improved laminated composite which, inter alia, has a high stiffness and impact toughness, displays a good surface quality and, in particular, can also be cured more quickly and more easily on the surface while at the same time remaining deformable in the interior.

We have found that this object is achieved by an improved laminated composite comprising a support made of a thermoplastic polymer, an intermediate layer located thereon which is likewise made of a thermoplastic polymer and a heat-cured layer applied to the intermediate layer, wherein a resin layer (a) having a degree of curing of at least 20% is additionally inserted between the support and the intermediate layer and a resin layer (c) having a degree of curing of at least 60% is inserted between the intermediate layer and the heat-cured layer.

In one embodiment of the laminated composite of the present invention, it can further comprise a resin layer (b) located on the intermediate layer and having a degree of curing of at least 20% between the intermediate layer and the resin layer (c) having a degree of curing of at least 60% and an additional decorative layer on this resin layer (b).

Furthermore, it may be advisable to choose the individual resin layers so that the degree of curing of the individual resin layers (a), (b) if present and (c) increases from the support in the direction of the heat-cured layer. Here, the degree of curing is the fraction of the maximum strength and stability which can be achieved by curing of the resins; this also correlates with the reactivity of the resin.

The material of which the support is made may contain from 1 to 60% by weight, preferably from 5 to 50% by weight, particularly preferably from 10 to 40% by weight, based on the total weight of the support, of reinforcing fillers such as barium sulfate, magnesium hydroxide, talc having a mean particle size in the range from 0.1 to 10 $\mu$m, measured in accordance with DIN 66 115, wood, flax, chalk, glass fibers, coated glass fibers, long or short glass fibers, glass spheres or mixtures of these. In addition, the customary additives such as light, UV and heat stabilizers, pigments, carbon black, lubricants, flame retardants, blowing agents and the like can be added to the material of the support in the customary and required amounts.

As thermoplastic polymers which form the support, it is possible to employ, inter alia, polypropylene, polyethylene, polyvinyl chloride, polysulfones, polyether ketones, polyesters, polycycloolefins, polyacrylates and polymethacrylates, polyamides, polycarbonate, polyurethanes, polyacetals, e.g. polyoxymethylene, polybutylene terephthalates and polystyrenes. Both homopolymers and copolymers of these thermoplastic polymers can be used. The support layer preferably comprises, apart from the reinforcing fillers, polypropylene, polyoxymethylene, polybutylene terephthalate or polystyrene, in particular copolymers of styrene with subordinate proportions of one or more comonomers such as butadiene, α-methylstyrene, acrylonitrile, vinylcarbazole and esters of acrylic, methacrylic or itaconic acid. The support of the laminated composite of the present invention may also comprise these thermoplastic polymers in recycled form.

For the purposes of the present invention, the term polyoxymethylene includes homopolymers and copolymers of aldehydes, for example of formaldehyde, and of cyclic acetals which contain repeating carbon-oxygen bonds in the molecule and have a melt flow rate (MFR) in accordance with ISO 1133, at 230° C. under a weight of 2.16 kg, of from 5 to 40 g/10 min, in particular from 5 to 30 g/10 min.

The polybutylene terephthalate preferably used is a higher molecular weight esterification product of terephthalic acid with butylene glycol and a melt flow rate (MFR) in accordance with ISO 1133, at 230° C. under a weight of 2.16 kg, of from 5 to 50 g/10 min, in particular from 5 to 30 g/10 min.

Suitable copolymers of styrene are, for example, copolymers containing up to 45% by weight, preferably up to 20% by weight, of copolymerized acrylonitrile. Such copolymers of styrene and acrylonitrile (SAN) have a melt flow rate (MFR) in accordance with ISO 1133, at 230° C under a weight of 2.16 kg, of from 1 to 25 g/10 min, in particular from 4 to 20 g/10 min.

Further, likewise preferred copolymers of styrene contain up to 35% by weight, in particular up to 20% by weight, of copolymerized acrylonitrile and up to 35% by weight, in particular up to 30% by weight, of copolymerized butadiene. The melt flow rate of such copolymers of styrene, acrylonitrile and butadiene (ABS), in accordance with ISO 1133 at 230° C. under a weight of 2.16 kg, is in the range from 1 to 40 g/10 min, in particular in the range from 2 to 30 g/10 min.

Other materials used for the support are, in particular, polyolefins such as polyethylene or polypropylene, with the latter being preferred. For the purposes of the present invention, the term polypropylene includes both homopolymers and copolymers of polypropylene. Copolymers of propylene contain subordinate amounts of monomers which can be copolymerized with propylene, for example $C_2$–$C_8$-alk-1-enes such as ethylene, 1-butene, 1-pentene or 1-hexene. It is also possible to use two or more different comonomers.

Particularly suitable support materials are, inter alia, homopolymers of propylene or copolymers of propylene containing up to 50% by weight of other 1-alkenes having up to 8 carbon atoms in copolymerized form. The copolymers of propylene may be random copolymers or block or impact-modified copolymers. If the copolymers of propylene have a random structure, they generally contain up to 15% by weight, preferably up to 6% by weight, of other 1-alkenes having up to 8 carbon atoms, in particular ethylene, 1-butene or a mixture of ethylene and 1-butene.

Block or impact-modified copolymers of propylene are polymers in which a propylene homopolymer or a random copolymer of propylene with up to 15% by weight, preferably up to 6% by weight, of other 1-alkenes having up to 8 carbon atoms is prepared in a first stage and then, in the second stage, a propylene-ethylene copolymer which has an ethylene content of from 15 to 18% by weight and may further comprise other $C_4$–$C_8$-alk-1-enes is polymerized onto the polymer from the first stage. In general, the amount of propylene-ethylene copolymer polymerized on in the second stage is such that the copolymer produced in the second stage makes up from 3 to 60% by weight of the end product.

The polymerization for preparing polypropylene can be carried out by means of a Ziegler-Natta catalyst system. In particular, use is made of catalyst systems which comprise not only a titanium-containing solid component a) but also cocatalysts in the form of organic aluminum compounds b) and electron donor compounds c).

However, it is also possible to use catalyst systems based on metallocene compounds or based on polymerization-active metal complexes.

Specifically, customary Ziegler-Natta catalyst systems comprise a titanium-containing solid component, e.g. halides or alkoxides of trivalent or tetravalent titanium, and also a halogen-containing magnesium compound, inorganic oxides such as silica gel as support and electron donor compounds. Possible electron donor compounds are, in particular, carboxylic acid derivatives and also ketones, ethers, alcohols or organosilicon compounds.

The titanium-containing solid component can be prepared by methods known per se. Examples are described, inter alia, in EP-A 45 975, EP-A 45 977, EP-A 86 473, EP-A 171 200, GB-A 2 111 066, U.S. Pat. No. 4,857,613 and 5,288,824. Preference is given to using the method known from DE-A 195 29 240.

Suitable aluminum compounds b) are trialkylaluminums and compounds of this type in which an alkyl group has been replaced by an alkoxy group or by a halogen atom, for example by chlorine or bromine. The alkyl groups may be identical or different. Linear or branched alkyl groups are possible. Preference is given to using trialkylaluminum compounds whose alkyl groups each have from 1 to 8 carbon atoms, for example trimethylaluminum, triethylaluminum, triisobutylaluminum, trioctylaluminum or methyldiethylaluminum or mixtures thereof.

Apart from the aluminum compound b), use is generally made of electron donor compounds c) such as monofunctional or polyfunctional carboxylic acids, carboxylic anhydrides or carboxylic esters, also ketones, ethers, alcohols, lactones and organophosphorus and organosilicon compounds as further cocatalyst, with the electron donor compounds c) being able to be identical to or different from the electron donor compounds used for preparing the titanium-containing solid component a).

In place of Ziegler-Natta catalyst systems, it is also possible to use metallocene compounds or polymerization-active metal complexes for preparing polypropylene.

For the purposes of the present invention, metallocenes are complexes of transition metals with organic ligands, which together with compounds capable of forming metallocenium ions give active catalyst systems. When used for preparing polypropylene, the metallocene complexes are generally present in supported form in the catalyst system. Inorganic oxides are frequently used as supports, but it is also possible to use organic supports in the form of polymers, for example polyolefins. Preference is given to the above-described inorganic oxides which are also used for preparing the titanium-containing solid component a).

Customarily used metallocenes contain titanium, zirconium or hafnium as central atom, with zirconium being preferred. In general, the central atom is bound via a π bond to at least one, generally substituted, cyclopentadienyl group and also to further substituents. The further substituents can be halogens, hydrogen or organic radicals, with fluorine, chlorine, bromine or iodine or a $C_1$–$C_{10}$-alkyl group being preferred. The cyclopentadienyl group can also be a constituent of a corresponding heteroaromatic system.

Preferred metallocenes contain central atoms which are bound via two similar or different π bonds to two substituted cyclopentadienyl groups, and among these particular preference is given to those in which substituents of the cyclopentadienyl groups are bound to both cyclopentadienyl groups. Very particular preference is given to complexes whose substituted or unsubstituted cyclopentadienyl groups are additionally substituted on two adjacent carbon atoms by cyclic groups; the cyclic groups can also be integrated into a heteroaromatic system.

Further preferred metallocenes are ones which contain only one substituted or unsubstituted cyclopentadienyl group which is, however, substituted by at least one radical which is also bound to the central atom.

Examples of suitable metallocene compounds are
ethylenebis(indenyl)zirconium dichloride,
ethylenebis(tetrahydroindenyl)zirconium dichloride,
diphenylmethylene-9-fluorenylcyclopentadienylzirconium dichloride,
dimethylsilanediylbis(3-tert-butyl-5-methylcyclopentadienyl) zirconium dichloride,
dimethylsilanediyl(2-methyl-4-azapentalene)(2-methyl-4 (4'-methylphenyl)indenyl)zirconium dichloride,
dimethylsilanediyl(2-methyl-4-thiapentalene)(2-ethyl-4(4'-tert-butylphenyl)indenyl)zirconium dichloride,
ethanediyl(2-ethyl-4-azapentalene)(2-ethyl-4(4'-tert-butylphenyl)-indenyl) zirconium dichloride,
dimethylsilanediylbis(2-methyl-4-azapentalene)zirconium dichloride,
dimethylsilanediylbis(2-methyl-4-thiapentalene)zirconium dichloride,
dimethylsilanediylbis(2-methylindenyl)zirconium dichloride,
dimethylsilanediylbis(-2-methylbenzindenyl)zirconium dichloride,
dimethylsilanediylbis(-2-methyl-4-phenylindenyl)-zirconium dichloride,
dimethylsilanediylbis(-2-methyl-4-naphthylindenyl)-zirconium dichloride,
dimethylsilanediylbis(-2-methyl-4-isopropylindenyl)-zirconium dichloride or
dimethylsilanediylbis(-2-methyl-4,6-diisopropylindenyl)-zirconium dichloride and also the corresponding dimethylzirconium compounds.

The metallocene compounds are either known or are obtainable by methods known per se. Mixtures of such metallocene compounds can also be used as catalysts, as can the metallocene complexes described in EP-A 416 815.

In addition, the metallocene catalyst systems further comprise compounds capable of forming metallocenium ions. Suitable compounds of this type are strong, uncharged Lewis acids, ionic compounds having Lewis-acid cations or ionic compounds containing Brönsted acids as cation. Examples are tris(pentafluorophenyl)-borane, tetrakis(pentafluorophenyl)borate or salts of N,N-dimethylanilinium. Open-chain or cyclic aluminoxane compounds are likewise suitable as compounds capable of forming metallocenium ions. These are usually prepared by reaction of a trialkylaluminum with water and are generally in the form of mixtures of both linear and cyclic chain molecules of various lengths.

Furthermore, the metallocene catalyst systems may further comprise organometallic compounds of metals of main groups I, II and III of the Periodic Table, for example n-butyllithium, n-butyl-n-octylmagnesium or triisobutylaluminum, triethylaluminum or trimethylaluminum.

The preparation of the polypropylenes used for the support layer is carried out by polymerization in at least one, frequently in two or even more reaction zones connected in series (reactor cascade), in the gas phase, in suspension or in a liquid phase (bulk phase). It is possible to use the customary reactors employed for the polymerization of $C_2$–$C_8$-alk-1-enes. Examples of suitable reactors are continuously operated stirred vessels, loop reactors and fluidized-bed reactors. The size of the reactors is not of great importance. It depends on the output which is to be achieved in the reaction zone or in the individual reaction zones.

Reactors used are, in particular, fluidized-bed reactors and horizontally or vertically stirred powder-bed reactors. The reaction bed generally comprises the $C_2$–$C_8$-alk-1-ene polymer which is produced in the respective reactor.

The polymerization to prepare the polypropylenes used as support layers is carried out under customary reaction conditions at from 40 to 120° C., in particular from 50 to 100° C., and pressures of from 10 to 100 bar, in particular from 20 to 50 bar.

The polypropylenes used as support generally have a melt flow rate (MFR), in accordance with ISO 1133, of from 0.1 to 200 g/10 min, in particular from 0.2 to 100 g/10 min, at 230° C. and a weight of 2.16 kg.

In the laminated composite of the present invention, it is also possible to use blends, i.e. mixtures of different thermoplastic polymers, for example blends of a copolymer of styrene with acrylonitrile and a copolymer of butadiene and acrylonitrile, as supports.

According to the present invention, the laminated composite comprises a resin layer (a) having a degree of curing of at least 20%, in particular at least 30% and particularly preferably at least 40%, between the support and the intermediate layer. The resins customary in plastics technology can be used in the resin layer (a). These include, inter alia, acrylic resins, phenolic resins, urea resins or melamine resins. Particular preference is given to using phenolic resins or urea resins for the resin layer (a). The resin layer (a) preferably has a degree of resin coating of from 50% to 300%, in particular from 100% to 250%, and a thickness of from 0.001 to 1.0 mm, in particular from 0.01 to 0.08 mm.

In the laminated composite of the present invention, a further layer of a thermoplastic as bonding material, preferably of the same thermoplastic as the support, is applied as intermediate layer to the resin layer (a) as a result of which the adhesion between support and intermediate layer is particularly improved. The intermediate layer is, in particular, in the form of a thin film or else as a thin nonwoven or woven fabric having a thickness of from 0.001 to 1.0 mm, in particular from 0.005 to 0.3 mm. Materials suitable for the intermediate layer are the same thermoplastics as have been described above for the supports, i.e., in particular, polypropylene and polyethylene, polymers of styrene, polyoxymethylene or polybutylene terephthalate.

A resin-impregnated nonwoven or woven fabric or a resin-impregnated film of a thermoplastic can also be used as intermediate layer. Resins used for this purpose are, in particular, acrylate resins, phenolic resins, urea resins or melamine resins. The degree of resin coating can be up to 300%, which means that virtually the entire surface of the intermediate layer is multiply covered with resin. The degree of resin coating is preferably from 50 to 150%, in particular from 80 to 120%. The weight of the intermediate layer per $m^2$ is in the range from 15 to 150 g, in particular in the range from 30 to 60 g.

In a preferred embodiment, the laminated composite of the present invention may further comprise a resin layer (b) located on the intermediate layer and having a degree of curing of at least 20% between the intermediate layer and the resin layer (c) having a degree of curing of at least 60% and also a decorative layer on this resin layer (b).

The resin layer (b) has a degree of curing of at least 20%, in particular at least 40% and particularly preferably at least 60%. In the resin layer (b), it is likewise possible to use the resins customary in plastics technology. These include, inter alia, acrylic resins, phenolic resins, urea resins or melamine resins. Particular preference is given to using phenolic resins or urea resins for the resin layer (b). The resin layer (b) preferably has a thickness of from 0.001 to 1.0 mm, in particular from 0.01 to 0.08 mm. The degree of resin coating of the resin layer (b) is preferably from 50% to 300%, in particular from 100% to 300%.

The decorative layer can comprise a polymer material which is embossed or colored or both in combination, for example in the form of a finished laminate. However, the decorative layer can also be made up of paper or of a fabric or a paper-like or fabric-like or wood-like or metal-like material. Examples would be decorative layers made of an aluminum-like material or a material resembling stainless steel or else leather-, silk-, wood-, cork- or linoleum-like material. The decorative layer can likewise be coated/impregnated with acrylic, phenolic, urea or melamine resins, with the degree of resin coating being able to be from 50 to 300%, in particular from 100 to 300%, based on the weight of the decorative layer. The weight of the decorative layer is usually in the range from 10 to 200 $g/m^2$, in particular from 25 to 150 $g/m^2$, and particularly preferably from 50 to 130 $g/m^2$.

In addition, the laminated composite of the present invention further comprises a resin layer (c) having a degree of curing of at least 60%, in particular at least 80% and particularly preferably at least 90%, either on the intermediate layer or else on the decorative layer. The resins customary in plastics technology, e.g. acrylic resins, phenolic resins, urea resins or melamine resins, can be used in the resin layer (c). Particular preference is given to using melamine resins or acrylic resins in the resin layer (c). The resin layer (c) has a thickness of preferably from 0.001 to 1.0 mm, in particular from 0.01 to 0.8 mm. Its degree of resin coating is generally from 50% to 300%, preferably from 100% to 300%.

The heat-cured layer (overlay) which is located on the resin layer (c) and forms the surface of the laminated composite of the present invention preferably comprises a thermoset polymer material, for example paper impregnated with acrylic resin, phenolic resin, melamine resin or urea resin which is crosslinked by the action of pressure or heat during production of the laminated composite. The weight of the heat-cured layer (overlay) is usually in the range from 10 to 300 $g/m^2$, in particular from 15 to 150 $g/m^2$ and particularly preferably from 20 to 70 $g/m^2$.

The heat-cured layer (overlay) can be located as finished laminate on the resin layer (c) either on one side or on both sides. It is also possible to apply a finished laminate consisting of the decorative layer, the resin layer (c) and the overlay onto the intermediate layer.

The total thickness of the laminated composite of the present invention is in the range from 1 mm to 100 mm, preferably in the range from 1 mm to 20 mm, in particular in the range from 1.5 to 10 mm, with the support making up at least 80%, preferably at least 90%, of the total thickness.

The laminated composites of the present invention can be processed by a process in which the materials for the intermediate layer, any desired decorative layer and the heat-cured layer and also the resin layers (a), (b) if desired and (c) are each provided in the form of thin sheets and are subsequently joined to the material for the support at from 150 to 300° C. in particular from 160 to 280° C. The intermediate layer, any desired decorative layer and the heat-cured layer (overlay) and also the resin layers (a), (b) if desired and (c) can also advantageously be used together in the form of a finished laminate which is likewise in the form of a sheet.

Furthermore, it is possible to join the intermediate layer, any desired decorative layer and the heat-cured layer and also the resin layers located between them by dipping in a bath of adhesive or by use of thin adhesive strips in a press, preferably a double band press, to one another first and subsequently to apply this composite to the support. Here, it can also be advisable to shape the composite of intermediate layer, any desired decorative layer and the heat-cured layer and also the resin layers located between them two-dimensionally first by a deep-drawing process or direct shaping, for example in an injection-molding tool, and then to combine this with the thermoplastic which is to form the support by backfilling, extrusion, welding or hot pressing. If the support and the intermediate layer consist of identical thermoplastics, very good adhesion between the two layers is observed.

The process for producing the laminated composite of the present invention can also be modified so that the laminated composite is shaped three-dimensionally after prior heat treatment at from 150 to 300° C., in particular from 150 to 250° C. and particularly preferably from 160 to 200° C. In this way, it is possible to produce, for example, shaped bodies for the electrical, building and automobile industries.

The laminated composite of the present invention can also be produced by joining the heat-cured layer to the intermediate layer, any desired decorative layer and the support and also the resin layers (a), (b) if desired and (c) located between them by means of processing methods customary in the plastics industry. Customary processing methods include, inter alia, injection molding, extrusion, welding or hot pressing of the individual layers.

In injection molding, the individual layers, i.e. the support, the intermediate layer, any desired decorative layer and the heat-cured layer and also the resin layers (a), (b) if desired and (c) located between them are either preshaped directly by means of a deep-drawing process and are subsequently backfilled together in an injection-molding tool, or else are directly shaped together only in the injection-molding tool and backfilled. This can be done either on one side or on both sides; in the latter case, the intermediate layer, any desired decorative layer, the heat-cured layer and also the resin layers (a), (b) if desired and (c) located between them are located on both sides of the support. This injection molding process is usually carried out at from 150 to 300° C., in particular from 180 to 280° C., preferably from 190 to 270° C., and pressures of from 50 to 100 $N/cm^2$, in particular from 60 to 80 $N/cm^2$. As a result of the temperatures and pressures prevailing in the injection-molding tool, not only very good adhesion of the individual layers to one another but also further curing of the laminated composite of the present invention are achieved. The laminated composite is very flexible, compared to the laminated composites known hitherto and can readily be shaped in further processing steps.

In the extrusion process, the intermediate layer, any desired decorative layer and the heat-cured layer and also the resin layers (a), (b) if desired and (c) located between them of the laminated composite of the present invention are combined with the thermoplastic of the support on one or both sides by means of heated calendering or embossing rolls (laminating) and joined to one another in this way. Temperatures employed are usually from 150 to 300° C., in particular from 160 to 250° C., preferably from 170 to 220° C., and pressures are from 40 to 200 N/cm², in particular from 50 to 100 N/cm². In this way, very good adhesion of the individual sheets to one another is achieved. The laminated composite obtained also has good surface properties.

A variant of the extrusion process is the profile extrusion process in which the individual layers of the laminated composite of the present invention, in particular the intermediate layer, are shaped by means of a sizing unit so that they can subsequently be combined directly with the actual profile, i.e. the thermoplastic support.

Furthermore, the laminated composite of the present invention can also be obtained by hot pressing of the individual layers, which can be shaped either beforehand by means of a prior deep-drawing process or else directly in the press. Here, a granulated thermoplastic is placed directly on a laminate made up of the intermediate layer, any desired decorative layer and the heat-cured layer and also the resin layers (a), (b) if desired and (c) located between them, and the materials are pressed together at from 150 to 300° C., in particular from 160 to 250° C., preferably from 170 to 230° C., pressures of from 50 to 120 N/cm², in particular from 80 to 100 N/cm², and pressing times of from 0.5 to 10 min, in particular from 1 to 5 min and particularly preferably from 1 to 3 min.

In addition, the laminated composite of the present invention can also be produced by welding together the individual layers, i.e. the support material, the intermediate layer, any desired decorative layer and the heat-cured layer and also the resin layers (a), (b) if desired and (c) located between them. Possible welding techniques are, inter alia, ultrasonic welding, hot gas welding, vibration welding or orbital welding. Here, the individual layers are assembled as sheets and are joined to one another at from 150 to 300° C., in particular from 170 to 280° C.

The laminated composites obtainable in this way can also be colored on their surface.

Owing to the good adhesion between the individual layers, the laminated composites of the present invention display good mechanical properties. They can readily be shaped two- or three-dimensionally and also have a high resistance to high temperatures or chemicals and a high surface quality when the resin layers used are chosen appropriately.

Owing to the different degree of curing of the individual resin layers (a), (b) if present and (c), with the inner resin layer (a) being cured to a lesser degree than the subsequent resin layers (c) and, if present, (b), it is possible for the curing time to be reduced significantly without the very complete curing of the surface of the laminated composite of the present invention being made more difficult. This is attributable, inter alia, to the fact that the only partially cured resin layers (a) and, if present, (b) in the lower region of the laminated composite allow good heat transfer from the hotter side of the tool to the colder side of the tool.

Furthermore, the laminated composites of the present invention can be shaped readily because of the specific way in which they are made up.

The laminated composites of the present invention are suitable, inter alia, for producing furniture, floor coverings, wall panels, household appliances or shaped bodies in the electrical, building or automobile industry.

The following example illustrates the invention.

EXAMPLE

A composite comprising various layers was placed in an injection-molding tool with the heat-cured layer on the ejector side. The composite consisted of a 60%-cured urea resin as resin layer (a) having a degree of resin coating of 250%, a superposed intermediate layer comprising a nonwoven made of a polypropylene prepared using metallocene catalysts and having a melting point of about 135° C. and a density of 30 g/m², a superposed resin layer b) comprising a phenolic resin having a degree of resin coating of 300%, which was 60%-cured, a decorative layer comprising a printed thermoplastic film of a polypropylene having a weight of 25 g/m² and prepared using metallocene catalysts located on the resin layer (b), a resin layer (c) comprising an 85%-cured melamine resin having a degree of resin coating of 300% and a heat-cured layer (overlay) made of paper impregnated with melamine resin and having a weight of 30 g/m² and a degree of curing of likewise 85%.

A melt of a propylene homopolymer prepared using metallocene catalysts was injected onto this composite in the injection-molding tool for a period of 0.03 minutes at 260° C. The propylene homopolymer had a melt flow rate (MFR) in accordance with ISO 1133 of 20 g/ 10 min at 230° C. and 2.16 kg. The propylene homopolymer formed the material for the support.

As a result of the different degrees of curing of the resins and the prevailing melt temperature of 260° C., the resin combinations are activated, i.e. the nonwoven impregnated with urea resin having a degree of curing of 60% experiences the full temperature of 260° C.

Owing to the different degrees of curing of the individual resin layers, the laminated composite obtainable in this way displays favorable distortion behavior compared to the thermoplastic. Furthermore, the laminated composite obtained has an about 10% higher impact toughness and stiffness compared to the previously known laminated composites.

We claim:

1. A laminated composite comprising a support made of thermoplastic polypropylene, an intermediate layer located thereon which is made of a thermoplastic polymer and a heat-cured layer applied to the intermediate layer, wherein a resin layer (a) having a degree of curing of at least 20% is additionally inserted between the support and the intermediate layer, a resin layer (c) having a degree of curing of at least 60% is inserted between the intermediate layer and the heat-cured layer and a resin layer (b) located on the intermediate layer and having a degree of curing at least 20% is additionally inserted between the intermediate layer and the resin layer (c) having a degree of curing of at least 60% and an additional decorative layer is applied to this resin layer (b), and wherein the degree of curing of the individual resin layers (a), (b) and (c) increases from the supoort in the direction of the heat-cured layer.

2. A laminated composite as claimed in claim 1, wherein the degree of curing of the resin layer (a) is at least 30%, the degree of curing of resin layer (b) is at least 40% and the degree of curing of the resin layer (c) is at least 80%.

3. A laminated composite as claimed in claim 1, wherein the intermediate layer comprises a resin-impregnated nonwoven made of the thermoplastic.

4. A laminated composite as claimed in claim 1, wherein the resin layezs (a) and (b) comprise a urea resin or a phenolic resin.

5. A laminated composite as claimed in claim 1, wherein the resin layer (c) comprises a melamine resin or an acrylic resin.

6. A process for producing a laminated composite as claimed in claim 1, which comprises providing the materials for the intermediate layer, the decorative layer and the heat-cured layer and for the resin layers (a), (b) and (c), in each case in the form of thin sheets and subsequently joining them to the support at from 150 to 300° C.

7. A process as claimed in claim 6, wherein the individual resin layers (a), (b) and (c) are joined to support, the intermediate layer, the decorative layer and the beat-cured layer by injection molding.

8. A process as claimed in claim 6, wherein the individual resin layers (a), (b) and (c) are joined to the support, the intermediate layer, the decorative layer and the heat-cured layer by extrusion.

9. A process as claimed in claim 6, wherein the individual resin layers (a), (b) and (c) are joined to the support, the intermediate layer, the decorative layer and the heat-cured layer by hot pressing.

10. A process as claimed in claim 6, wherein the individual resin layers (a), (b) and (c) are joined to the support, the intermediate layer, the decorative layer and the heat-cured layer by welding.

* * * * *

UNITED STATES PATENT AND TRADEMARK OFFICE
CERTIFICATE OF CORRECTION

PATENT NO. : 6,972,153 B2
DATED : December 6, 2005
INVENTOR(S) : Müller et al.

It is certified that error appears in the above-identified patent and that said Letters Patent is hereby corrected as shown below:

<u>Column 11,</u>
Line 4, replace claim 4 with the following:
A laminated composite as claimed in claim 1, wherein the resin layers (a) and (b) comprise a urea resin or a phenolic resin.

<u>Column 11, line 16 - Column 12, line 2,</u>
Replace claim 7 with the following:
A process as claimed in claim 6, wherein the individual resin layers (a), (b) and (c) are joined to support, the intermediate layer, the decorative layer and the heat-cured layer by injection molding.

Signed and Sealed this

Ninth Day of May, 2006

JON W. DUDAS
*Director of the United States Patent and Trademark Office*